US007931060B2

(12) United States Patent
Joubert et al.

(10) Patent No.: US 7,931,060 B2
(45) Date of Patent: Apr. 26, 2011

(54) ADHESION CHAIN FOR THE WHEEL OF AN AUTOMOTIVE VEHICLE

(75) Inventors: Xavier Joubert, Ambert (FR); Bernard Joubert, Ambert (FR); Adam Jara, Clermont Ferrand (FR); Frédéric Perrin, Beaumont (FR)

(73) Assignee: Commissariat á l'Energie Atomique, Paris (FR)

( * ) Notice: Subject to any disclaimer, the term of this patent is extended or adjusted under 35 U.S.C. 154(b) by 141 days.

(21) Appl. No.: 12/442,022

(22) PCT Filed: Sep. 17, 2007

(86) PCT No.: PCT/FR2007/051946
§ 371 (c)(1),
(2), (4) Date: Mar. 19, 2009

(87) PCT Pub. No.: WO2008/035000
PCT Pub. Date: Mar. 27, 2008

(65) Prior Publication Data
US 2010/0018620 A1     Jan. 28, 2010

(30) Foreign Application Priority Data
Sep. 20, 2006   (FR) ..................................... 06 53832

(51) Int. Cl.
*B60C 27/06*     (2006.01)
*B60C 27/18*     (2006.01)
(52) U.S. Cl. ......... 152/171; 152/172; 152/221; 152/222

(58) Field of Classification Search .................. 152/170, 152/171, 172, 185, 187, 217, 218, 219, 221, 152/222, 231, 239, 240, 243
See application file for complete search history.

(56) References Cited

U.S. PATENT DOCUMENTS

| 710,562 | A | * | 10/1902 | De Caters | 152/173 |
| 1,342,753 | A | * | 6/1920 | McGeorge | 152/170 |
| 1,700,081 | A | * | 1/1929 | Schemmel | 206/304.1 |
| 1,908,808 | A | * | 5/1933 | Auciunas | 152/177 |
| 2,341,316 | A | | 2/1944 | Ederer | |
| 2,392,577 | A | * | 1/1946 | Castricum | 152/177 |
| 2,682,907 | A | * | 7/1954 | Krueger | 152/222 |

(Continued)

FOREIGN PATENT DOCUMENTS
DE           1605718           3/1970
(Continued)

OTHER PUBLICATIONS

European Patent Office, International Search Report for PCT/FR2007/051946, dated Mar. 5, 2008 (4 pgs.) (2 pgs. in English language and 2 pgs. In French language).

Primary Examiner — Russell D Stormer
(74) Attorney, Agent, or Firm — TD Evans, P.C.

(57) ABSTRACT

This adhesion chain for the wheel of a motor vehicle comprises an adhesion tread intended to be in contact with at least the tread of the wheel concerned, and kept in place by means of respectively external and internal tensioning cables. The adhesion tread consists of a net prepared from textile material, said net being prepared by knitting of cords themselves prepared by knitting, so as to define the meshes of said net, and in that the cords include a reinforcing core from a high-modulus material.

17 Claims, 2 Drawing Sheets

U.S. PATENT DOCUMENTS

| | | | | |
|---|---|---|---|---|
| 3,934,633 | A | * | 1/1976 | Bula ............................ 152/221 |
| 4,266,593 | A | * | 5/1981 | Hayashi ....................... 152/218 |
| 5,009,256 | A | * | 4/1991 | Smith .......................... 152/221 |
| 6,860,304 | B1 | * | 3/2005 | Dalrymple ................... 152/175 |
| 7,013,548 | B1 | * | 3/2006 | Lotveit ........................... 29/450 |
| 2008/0230165 | A1 | * | 9/2008 | Maritano ...................... 152/221 |

FOREIGN PATENT DOCUMENTS

| | | | |
|---|---|---|---|
| FR | 2249782 | | 5/1975 |
| JP | 02216306 A | * | 8/1990 |

* cited by examiner

ADHESION CHAIN FOR THE WHEEL OF AN AUTOMOTIVE VEHICLE

CROSS REFERENCE TO RELATED APPLICATIONS

This application is a National Stage filing under 35 U.S.C. §371 of PCT Application No. PCT/FR2007/051946, filed Sep. 17, 2007. This application also claims the benefit of French Application No. 0653832, filed Sep. 20, 2006. The entirety of both applications is incorporated herein by reference.

FIELD OF THE INVENTION

The invention relates to a device for conferring adhesion for a wheel of a motor vehicle, in particular on snow. Such a device is conventionally called a "chain" because the various devices performing this function, known to date, have the form of chains, usually metal, such that the term has become generic.

BACKGROUND OF THE INVENTION

The major problems faced by users of such chains reside on the one hand, in their installation on the vehicle wheels in question, and on the other hand, in the relatively high weight of the metal chains.

Due to the inherent purpose of such a product, they are installed in generally difficult conditions, because the user normally waits until the very last moment, that is when there is no longer any adhesion, before installing them, hence in an often substantial thickness of snow. Furthermore, the installation of these chains is laborious, because the adhesion means that they must be correctly positioned on the tread of the wheels in question, besides their proper adjustment thereon, to prevent the accidental skipping of the chains when the wheel rotates, as well as the undesirable noise that it inevitably generates.

In order to overcome these drawbacks, chains of the type in question have been proposed, for example in document WO 00/59745 comprising a belt made essentially from a textile material and suitable for surrounding the tread of the wheel concerned. This textile belt is kept in place by means of flexible internal and external side portions. In this document, the tread consists of a lattice made from PVC coated with a polyester and even with rubber or polyurethane, in order to confer the necessary strength on the textile material employed.

However, although these chains offer a non-negligible gain in weight compared to conventional chains, they are, as a corollary, accompanied by a complication of the manufacturing process, impacting their production cost.

SUMMARY OF THE INVENTION

It is the object of the present invention to propose chains called "textile" chains overcoming the drawbacks of the prior art, and also capable of offering greater wear resistance.

This adhesion chain for the wheel of a motor vehicle comprises an adhesion tread intended to be in contact with at least the tread of the wheel concerned, and kept in place by means of respectively external and internal tensioning cables.

According to the invention, the adhesion tread consists of a net prepared from textile material, said net being prepared by knitting of cords themselves prepared by knitting, so as to define the meshes of said net, said cords including a reinforcing core, made from a high-modulus material.

In other words, the invention consists in producing for the adhesion tread of the chains in question, a net based on cords, in particular made from polyester, polyamide or a polyamide based polymer by knitting, and enclosing an aramid fiber reinforcing core, and in assembling such yarns or cords, also by knitting, so as to define meshes, particularly diamond or square shaped and measuring 40×40 mm, suitable for defining the adhesion tread.

In the context of the present invention, high-modulus material means a material having a breaking tenacity or tensile strength above 150 cN/tex and/or an initial modulus above 1000 cN/tex.

It is in fact observed that if a reinforcing core having a tenacity lower than this value is employed, the technical effect obtained is not significant, so that the integration of such a core becomes useless.

In the context of the present invention, "initial modulus" in the present description means the stretching modulus at low deformation of the components of the reinforcing core. This initial modulus is defined as being the slope of the linear portion of the load/elongation curve of the core, measured just after a standard pre-tension of 0.5 cN/tex.

The initial modulus and the mechanical properties in extension mentioned in the present application (particularly breaking tenacity, tensile strength in particular), are measured in a manner known per se, by means of measurements of the load (daN)/elongation (%) type, performed using an "INSTRON" machine with "4D" clamps, and using the following operating parameters: tensile length: 400 mm; tensile loading rate: 200 mm/min; and standard pre-tension: 0.5 cN/tex.

Concerning the units employed, it should be recalled: that the tex is a thread count unit: weight in g of 1000 m of yarn, considering that 0.111 tex=1 denier; that the tenacity is usually expressed for a textile material in cN/tex, considering that 1 cN/tex=0.11 g/denier.

Aramid fiber is advantageously selected as the material.

The cords constituting the net are prepared as already stated by knitting, so that their outer envelope has a typical average thickness of between 3 and 7 mm. In the context of the present invention, thickness means the smallest transverse dimension of its cross section, when it is not circular.

These cords are made from polyester or polyamide 6 or polyamide 66.

According to the invention, the net constituting the adhesion tread is closed by means of a closure strap, also called a junction strip.

Furthermore, the inside edge of said net intended to be folded back on the inside of the wheel is provided with an elastic tensioning cable, capable of having an elongation capacity close to 120%. It advantageously has a tensile strength above 55 daN.

Simultaneously, the outer edge of said net, intended to be folded back on the outside of the wheel is provided with a rigid cable or cord, therefore inelastic, intended to lock the net once in place on the wheel. The cable used ideally has a zero elongation under low load, or in any case, limited to 1% under a tensile load of 10 daN, and 10% under a tensile load of 100 daN.

The locking function that this cable is intended to perform, is further capable of being duplicated by means of crossed diametral straps, of which the number (2 to 4) depends on the dimensions of the wheel. Advantageously, these straps are joined together at their point of intersection, thereby facilitating the centering of the chain with regard to the wheel during the installation.

According to this configuration, a range of chains is actually defined, of which the sizes vary for the purpose of allowing their adjustment to the various tire sizes available on the market. It is however clear that several tire sizes correspond to a chain size concerned, obtained by adjusting the elasticity of the internal tensioning cable.

According to one feature of the invention, the junction zones of the cords defining the meshes of the net constituting the chain are obtained by knitting, and only make use of the components of the knit to the exclusion of the reinforcing core.

In doing so, shear mechanisms, liable to occur between said reinforcing cores, are thereby avoided, and as a corollary, premature wear thereof.

Furthermore, the extra thicknesses at these junction zones are also avoided, thereby improving the adhesion functions of the chain, and promoting the general comfort of the vehicle.

Advantageously, the reinforcing core of the invention is only present substantially at the zone of the net intended to be in contact with the tread of the tire concerned. In other words, said net is free of this reinforcing core at its zones intended to be folded back on the sides of the tire concerned. In doing so, the installation of the net on said tire is thereby facilitated, because of a slight gain in flexibility. Moreover, the centering of said net on the tire, which is obtained automatically when the vehicle advances, is facilitated, thereby favoring the correct positioning of the chain on said tire, and as a corollary, reducing the risks of accidental skipping of the chain away from the wheel concerned. Moreover, the manufacturing cost of the net is decreased.

According to another advantageous feature of the invention, the net, at the various intersections of the cords which define the meshes constituting it, and limited to the zone intended to be above the tread of the tire, comprises clips, optimizing the junction of the cords at this level. More precisely, these clips, added on at this level after production of the net, and therefore intended to be in contact with the carriageway, serve to relieve the cords constituting the net, lengthening the service life of the chain.

These clips are metallic, or are made from plastic or thermoplastic.

In a particular advantageous version, these clips are composite, with in particular a metal insert partially covered with a thermoplastic, the uncovered zone being directed toward the outside of the net, and intended to be in contact with the carriageway, whereas the remainder is covered with thermoplastic, limiting the wear in contact with the cords constituting the net. These clips further optimize the adhesion of the chain to frozen surfaces (ice).

According to another advantageous feature of the invention, the cords constituting the net are coated with elastomer and in particular with polyurethane, so as to confer on them greater resistance to unraveling, in addition to greater abrasion resistance. Furthermore, the use of this impregnation promotes the self-centering of the net on the tire.

According to another advantageous feature of the invention, a plurality of strips extending transversally with regard to the privileged direction of movement of the wheel on which the chain is intended to be fastened are added on to the exterior of the adhesion tread of the chain, hence intended to be in contact with the carriageway, and are also provided on their outer surface with nibs or lugs, suitable for promoting the adhesion of the wheel on ice.

These transverse strips are distributed periodically or not along the tread, and are typically 6 to 8 in number.

BRIEF DESCRIPTION OF THE FIGURES

The manner in which the invention can be implemented and the advantages thereof will appear more clearly from the exemplary embodiments that follow, provided for information and nonlimiting, in conjunction with the appended figures.

DETAILED DESCRIPTION OF THE INVENTION

Figure 1:
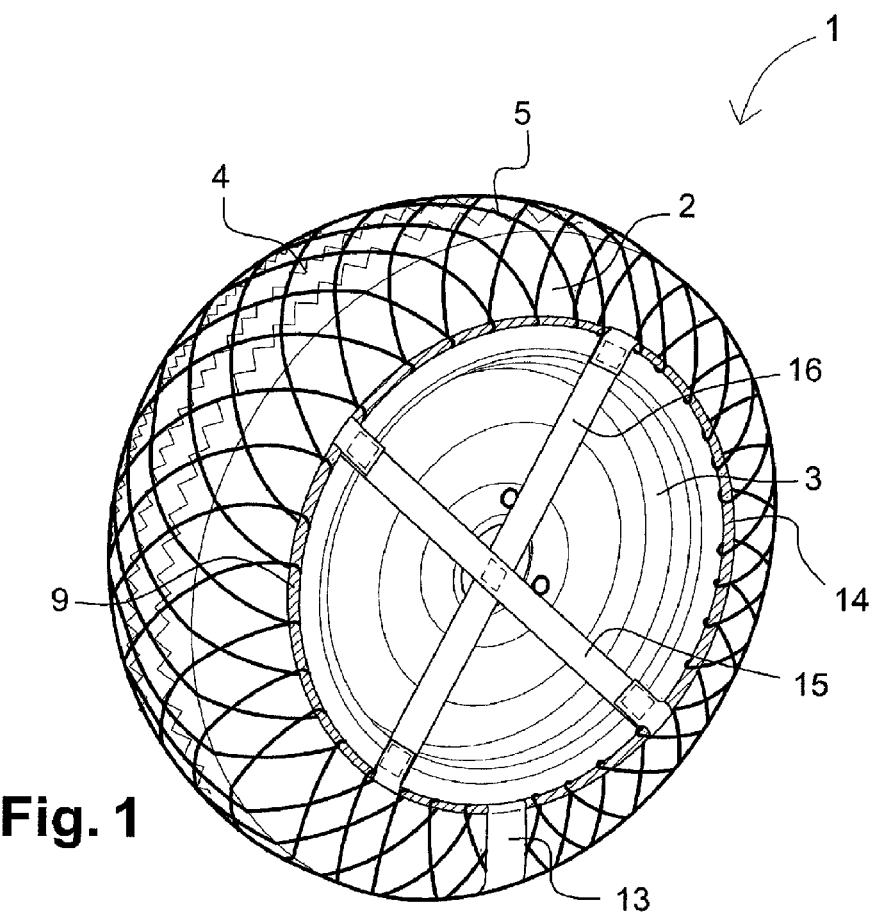
FIG. 1 shows a schematic perspective view of a wheel provided with a textile chain according to a first embodiment of the invention.
Figure 2:
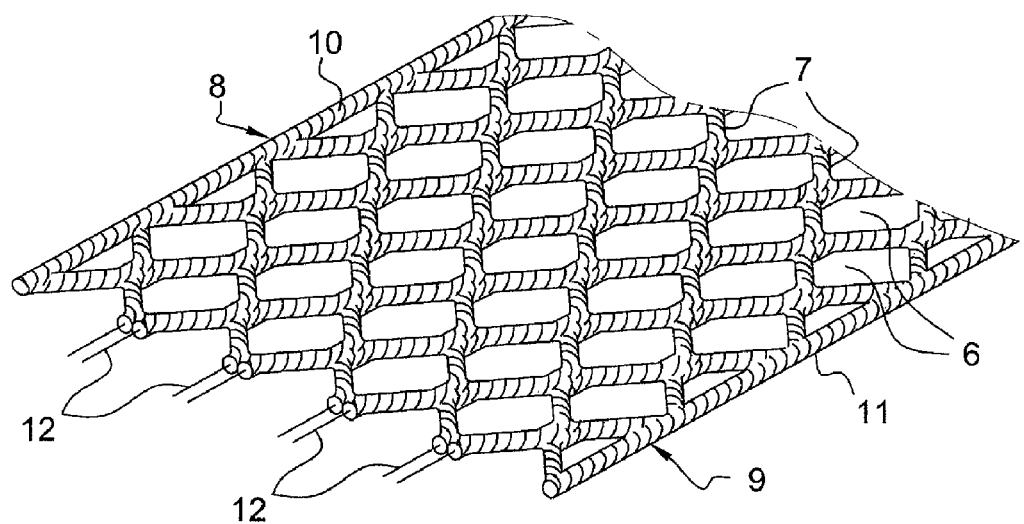
FIG. 2 shows a schematic partial cross section of a particular embodiment of the net according to the invention.
Figure 3:
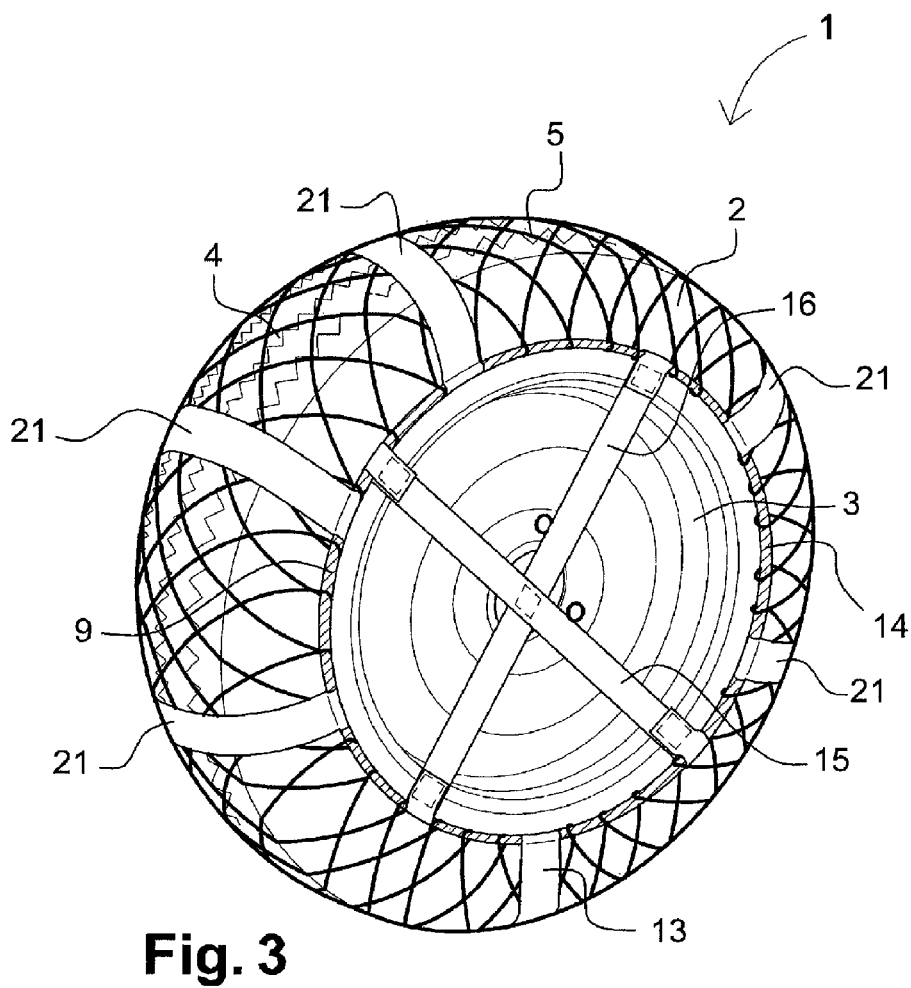
FIG. 3 shows another embodiment of the invention.

In the context of the present invention, and in direct association with the specification and the claims, by convention, the inside of the wheel (1) means the side at which the axle or cardan joint terminates, and the outside (3) of the wheel, is the side directly visible without any manipulation, and capable of accommodating a hubcap, for example.

The adhesion chain according to the invention basically comprises an adhesion tread (5), intended to be in intimate contact with the tread (4) of the tire mounted on the wheel to be equipped, between the sides (2) of said tire.

According to the invention, this adhesion tread (5) consists of a net made from textile material, and defining a number of meshes (6), said meshes being intended to form as many tread blocks, suitable for providing the desired adhesion on slippery and relatively loose surfaces, and particularly on snow.

In other words, the meshes thereby defined form lugs, of which the typical height above the tread (4) of the tire is about 3 to 7 mm.

This net is prepared by the knitting of cords (7), themselves obtained by knitting. According to one feature of the invention, the operation of knitting the cords (7) and the actual net (5) is carried out simultaneously, for example on Mueller knitting machines, and more precisely on a GWM square section rib knitting machine or on a RD3MT3 round section warp knitting machine.

The cords (7) are prepared as already stated by knitting, and each comprise a plurality of strands, and for example 3 to 10, the desired cord diameter being obtained by knitting and binding said strands together.

The number of strands also depends on the desired mechanical strength of said cords. Thus, and according to one embodiment of the invention, the cords consist of two braids of three strands made from polyester, and advantageously from polyamide 66. This material has the advantage of combining high mechanical strength, good adhesion properties, particularly on snow, and above all, high abrasion resistance.

Advantageously, the polyamide used is previously stabilized, by hot treatment (typically at about 120° C.), causing a pre-shrinkage.

According to the exemplary embodiment described, the net knitting density is such that excluding any reinforcing core, it has a linear density of 12.3 g/m.

Furthermore, and according to one feature of the invention, a core (12) made from a high-modulus material and typically from aramid fiber, is inserted during the production of the cords, in order to confer greater mechanical strength and abrasion resistance on the net.

This aramid has a breaking tenacity of 200 cN/tex. This material could be replaced by the material sold under the registered trade mark Vectran®, or by a polyethylene, sold under the registered trade mark Dyneema®, these two materials having a respective tenacity of 230 cN/tex and 180 cN/tex.

The insertion of this core (12) into the cords therefore only results from the cord knitting operation.

According to one feature of the invention, the respective cores of the cords never intersect, nor do they come into contact with one another. This eliminates shear mechanisms, and hence premature wear of these materials, in addition to the extra thicknesses at the junction zones of the cords, which define the meshes.

It is stated that the outermost cords of the net, respectively (10) and (11) are devoid of such a core (12).

Furthermore, and advantageously, the zones (17) and (18) of the net, that is the zones other than the zone (19) intended to be in contact with the tread (4) of the tire, are devoid of the core (12). In doing so, greater flexibility is conferred on the net, and as a corollary, its installation on the wheel is thereby facilitated. Moreover, the self-centering of the net during its installation, and also during the advance of the vehicle, is also thereby improved.

The polyamide cords thus provide protection of the reinforcing core against abrasion and mechanical injury, which proves to be particularly advantageous, especially during sudden braking, in which said abrasion forces are intense. As a corollary, the reinforcing core, for example of aramid fiber confers, greater tensile strength on the structure.

The original combination of the two, according to the invention, serves to have a flexible, lightweight chain which nevertheless performs its primary adhesion function, particularly in snow.

During the knitting operation, meshes (6) are defined, whereof the dimensions are substantially standardized (typically 40×40 mm), and which, when the net in question is stretched on the wheel of the motor vehicle, have a square or diamond shape, as may be observed in the various figures.

The net thus formed is defined by two side edges (8, 9), respectively internal (8) and external (9), intended to be folded back on either side of the tread (4) of the wheel concerned (1). As a corollary, these side edges are stressed for the positioning and maintenance of the textile chain thus prepared on said wheel.

Furthermore, the net is closed by means of a strap (13) called closure strap or junction strip, made from polyester or polyamide. This strap is fastened by welding, stitching, etc.

This strap may be duplicated, one extending under the net, and the other above, these two straps then being knitted to one another, and enclosing the two ends of the net by stitching. It may be simple, and surround the net, while extending above and below, the two strands thus defined also being stitched to one another, after the enclosing and stitching of the two ends of the net.

The meshes of the inside edge (8) of the net accommodate an elastic tensioning cable (not shown), of which the ends are joined to the closure strip or strap (13) during the installation of the latter.

This elastic tensioning cable is capable of having an elongation capacity close to 120%, suitable for allowing the effective positioning of the chain notwithstanding the closure of the adhesion tread (the net (5)) which constitutes it, that is the overlapping of the tread (4) of the wheel concerned, apart from the correct positioning of the chain and its sufficient tension to enable it to perform its function.

This elastic tensioning cable consists, for example, of a rubber core covered with a polyester sheath.

Simultaneously, the outer edge (9) of the net (5), intended to be folded back on the outside (2) of the wheel, is provided with a rigid cable or cord (14), hence inelastic, intended to lock the net once in place on the wheel.

This rigid cable consists for example of a polyester core, covered with a sheath, also made from polyester.

Owing to its locking function, this cable has an elongation capacity close to zero.

In doing so, and by the use of an elastic cable and a rigid cable, the net is literally threaded on the wheel, by adjusting the elasticity of the elastic internal tensioning cable.

In order to optimize the locking of the net on the wheel, the chain is provided with a plurality of crossed straps (15, 16), whereof the number (between 2 and 4) depends on the dimensions of the wheel, and whereof the ends are joined to the outer edge (9) of said net. Moreover, these straps are joined together substantially at their middle, that is at their point of intersection. These crossed straps therefore extend above the outside (3) of the wheel.

It is clear that in doing so, an adhesion chain is thereby obtained, which optimally presses against the tread (4) of the tire concerned. This prevents the chain from being dislodged from the tire, up to a relatively substantial speed, and particularly above 50 kph.

Advantageously, the intersecting zones of the cords (7) defining the meshes (6) are provided with clips (20). These clips (20) are only installed in the zone (19) of the net, that is the zone intended to be in contact with the tread of the tire.

Figure 4:
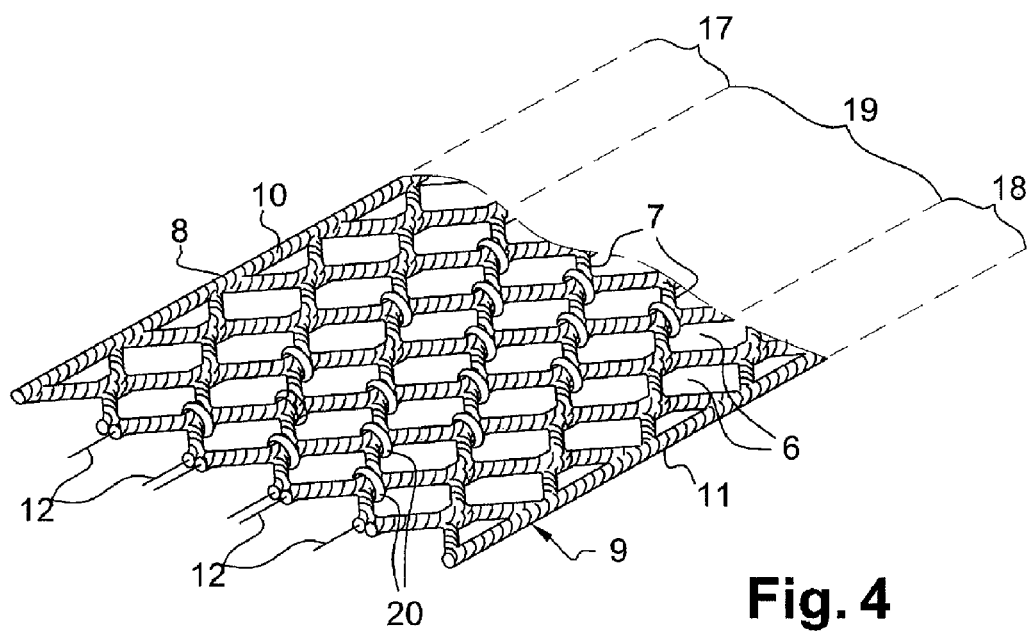
FIG. 4 shows another embodiment of the invention.

Moreover, while in FIG. 4, the mixed junction zones, that is located at the dividing line between the zone (19) and the adjacent zones (17) and (18) are devoid of such clips, it is perfectly conceivable for them to be provided therewith.

These clips (20) primarily optimize the junction of the cords (7) defining the meshes, relieving the force exerted on the polyamide constituting them. Moreover, being intended to be in contact with the carriageway owing to the lugs that they define with regard to the general envelope of the chain, they promote the adhesion, particularly on ice.

In the same spirit, a plurality (six to eight) of junction strips (21) are added on to the adhesion tread, extending between the two sides (10, 11) of the net, parallel to the junction strip (13) which effectively closes said net.

These strips are fastened by any means, and particularly by stitching, and are coated on their outer surface, that is on the surface intended to be in contact with the carriageway, with lugs or projections of any type, also capable of optimizing the adhesion of the wheel concerned to a frozen surface.

According to another advantageous feature of the invention, the cords (7) constituting the net are coated with elastomer, and more particularly with polyurethane, so as to confer greater resistance to unraveling, in addition to greater abrasion resistance.

This coating operation, is performed for example by roller or by spray, subsequent to the installation of the clips, when the net is provided therewith.

Furthermore, this coating is performed using very low viscosity polyurethane, typically lower than 20 centipoises, allowing very good impregnation of the constituent elements of the net. The polyurethane is selected so as to be cured at ambient or virtually ambient temperature.

Advantageously, the elastomer, and particularly the polyurethane, is only impregnated at the outside of the net, that is the side intended to be in contact with the carriageway. This is because the absence of this material at the inside of the net promotes the self-centering thereof.

The use of a knitted textile net according to the present invention also serves to confer a considerable gain in weight, also to facilitate the installation of these chains, and to confer on the tire an optimized adhesion to slippery carriageways, particularly when covered with snow or ice.

The invention claimed is:

1. An adhesion chain for a wheel, including a tire having a tread, of a motor vehicle, the adhesion chain comprising an adhesion tread intended to be in contact with at least the tread of the tire concerned, and to be kept in place by means of an internal side edge and an external side edge, said adhesion tread comprising:
  a net made from textile material, wherein said net comprises a plurality of cords, each cord prepared by knitting a plurality of strands together, each of said cords being joined together with another of said cords at a plurality of junction zones by knitting so as to define meshes of said net; and
  a reinforcing core made from a high-modulus material being enclosed within at least one of the plurality of cords that are in contact with the tread.

2. The adhesion chain as claimed in claim 1, wherein the high-modulus material constituting the reinforcing core has a breaking tenacity or tensile strength above 150 cN/tex and/or an initial modulus above 1000 cN/tex.

3. The adhesion chain as claimed in claim 1, wherein the high-modulus material constituting the reinforcing core is made from aramid fiber.

4. The adhesion chain as claimed in claim 1, wherein the plurality of junction zones of the cords defining the meshes of the net are obtained by knitting and only make use of the elements constituting the knit to the exclusion of the reinforcing core, such that said reinforcing cores do not intersect at the junction zones.

5. The adhesion chain as claimed in claim 1, wherein an outer envelope of the cords has a typical average thickness of between 3 and 7 mm.

6. The adhesion chain as claimed in claim 1, wherein the strands constituting the cords are prepared from polyester, polyamide 6 or polyamide 66.

7. The adhesion chain as claimed in claim 1, wherein the net constituting the adhesion tread is closed by means of a closure strap, wherein said internal side edge of said net, intended to be folded back on the inside of the wheel, is elastic, and
wherein said external side edge of said net, intended to be folded back on the outside of the wheel, is provided with a rigid cable or cord, intended to lock the net once in place on the wheel.

8. The adhesion chain as claimed in claim 7, wherein said internal side edge has an elongation capacity close to 120%.

9. The adhesion chain as claimed in claim 7, wherein said internal side edge has a tensile strength above 55 daN.

10. The adhesion chain as claimed in claim 7, wherein the chain is provided with a plurality of crossed straps, ends of each crossed strap are joined to the external side edge of said net, and extend across an outside surface of the wheel in order to optimize a locking of the net on the wheel.

11. The adhesion chain as claimed in claim 10, wherein the crossed straps are joined together at their point of intersection.

12. The adhesion chain as claimed in claim 1, wherein the net comprises clips at the junction zones of said net intended to optimize the junction zones, said clips being located on the adhesion tread such that they extend a distance beyond an outer envelope of the junction zone, and are therefore intended to be in contact with a carriageway.

13. The adhesion chain as claimed in claim 12, wherein the clips are made from one of a metal, a plastic, a thermoplastic, and a composite of a metal and a thermoplastic.

14. The adhesion chain as claimed in claim 13, wherein an uncovered zone of metal on the clip is directed toward the outside of the net, and intended to be in contact with the carriageway.

15. The adhesion chain as claimed in claim 1, wherein the cords constituting the net are coated with polyurethane.

16. The adhesion chain as claimed in claim 15, wherein the polyurethane is only impregnated at the outside of the net, that is, the side intended to be in contact with a carriageway.

17. The adhesion chain as claimed in claim 1, wherein a plurality of strips are added on to the outside of the adhesion tread of said chain, said strips extending transversally to a direction of rotation of the wheel on which the chain is intended to be fastened, and being intended to be in contact with a carriageway.

* * * * *

UNITED STATES PATENT AND TRADEMARK OFFICE
CERTIFICATE OF CORRECTION

| | | |
|---|---|---|
| PATENT NO. | : 7,931,060 B2 | Page 1 of 1 |
| APPLICATION NO. | : 12/442022 | |
| DATED | : April 26, 2011 | |
| INVENTOR(S) | : Xavier Joubert et al. | |

It is certified that error appears in the above-identified patent and that said Letters Patent is hereby corrected as shown below:

On the Title Page:

Item (73) Assignee should read: Joubert Productions (Ambert, FR)
Michelin Recherche Et Technique S.A. (Granges-Paccot, CH)

Signed and Sealed this
Thirteenth Day of September, 2011

David J. Kappos
*Director of the United States Patent and Trademark Office*